United States Patent [19]

Krüper

[11] Patent Number: 4,625,634
[45] Date of Patent: Dec. 2, 1986

[54] GRILL BASKET

[75] Inventor: Burkhard Krüper, Menden, Fed. Rep. of Germany

[73] Assignee: Cramer GmbH & Co. KG, Menden, Fed. Rep. of Germany

[21] Appl. No.: 765,494

[22] Filed: Aug. 15, 1985

[30] Foreign Application Priority Data

Jul. 5, 1985 [DE] Fed. Rep. of Germany ....... 3524093

[51] Int. Cl.⁴ .............................................. A47J 43/18
[52] U.S. Cl. ...................................... 99/427; D7/409; 99/402; 99/421 H; 99/449
[58] Field of Search .................. D7/409; 99/402, 427, 99/421 R, 421 H, 449, 450

[56] References Cited

U.S. PATENT DOCUMENTS

| D. 212,837 | 11/1968 | Kissner | 99/427 X |
| 2,983,218 | 5/1961 | Persinger | 99/427 |
| 3,188,939 | 6/1965 | Smith | 99/427 X |
| 4,442,763 | 4/1984 | Beller | 99/427 |

FOREIGN PATENT DOCUMENTS

| 2737417 | 2/1979 | Fed. Rep. of Germany | 99/427 |
| 7527465 | 4/1976 | France | 99/427 |

Primary Examiner—Billy J. Wilhite
Attorney, Agent, or Firm—Collard, Roe & Galgano

[57] ABSTRACT

In a grill basket, two mutually adjustable wire basket halves are provided. These wire basket halves comprise two longitudinal rods, the ends of which are bent-over in a hook-like manner. The two longitudinal rods are connected by transverse wires which are spaced at intervals from one another. End plates are provided for the adjustable connection of the two wire basket halves, and parallel, spaced-apart rows of holes are formed in each plate. The wire basket halves are hookable into said plates by their bent-over ends on the longitudinal rods, in the same way as perforate hooks are hooked into perforate walls. The spindles are disposed on their respective plates so that the grill basket is rotatably mounted on the appropriate means of a grill.

3 Claims, 6 Drawing Figures

GRILL BASKET

The present invention relates to a grill basket, comprising two mutually adjustable wire basket halves which are formed from a plurality of longitudinal rods and transverse wires and which are to be interconnected at their ends by connection members, each of said connection members being provided with a spindle or axle to permit rotatable movement.

These grill baskets serve to accommodate food articles of different dimensions for grilling, such as joints of meat, fish, or similar articles. A basket is mounted on a grill apparatus with its spindles or axles attached to suitable means and rotated so that the article for grilling can be cooked all-round, to the same extent, where possible. The advantage of these grill baskets over grill spits is that there is no need to pierce or skewer the article for grilling.

A grill basket is known which comprises two curved wire basket halves. In turn, these wire basket halves are formed from two longitudinal rods which are spaced apart from each other or from a suitable frame, whereon transverse wires which are concave in a transverse direction, or which are suitably bent-over, are kept spaced apart from one another. In such a case, guide members in the form of lugs or flat sheets are mounted at the ends of these two wire basket halves. Each spindle end is pierced by the lugs which are guided into one another during displacement. The securement of the spindle ends provides the connection between the lugs which lie adjacent one another, or are brought adjacent one another, and provides the mutual adjustment of the wire basket halves. To permit insertion of the article to be grilled, these grill baskets can pivot around the bearing spindle.

It proves difficult to assemble these grill baskets because, after purchase or after cleaning, it is necessary to join together the two grill basket halves via the spindle ends. This manner of joining the two wire basket halves also proves disadvantageous when the article being grilled shrinks during cooking and requires a smaller basket volume. For the mutual adjustment of the two wire basket halves, it is thus necessary, in the first instance, to detach the two spindles once more.

The present invention seeks to improve the assembly and adjustment during use of a grill basket of the above-mentioned type.

The object of the invention is achieved with a grill basket of said type which is characterized in that the connection members are plates, each plate having two parallel rows of holes or slots which are spaced from each other and have bent-over ends of the longitudinal rods of the wire basket halves hookable therein, clamping members being provided which connect the longitudinal rods and are supported on the inner surface of the plates after the ends have been hooked therein.

With the grill baskets according to the invention, the assembly and mutual adjustment of the grill basket halves are achieved in a very simple manner because it is only the grill basket halves at the end connection plates which are to be hooked in position. In such a case, it is advantageous for the upper grill basket half to be hooked in position so that it is centrally supported on the article to be grilled, with the result that the hook ends can be hooked into the corresponding pair of holes in the two rows of holes provided in each connection plate, using slight initial tension therefore. Initially, therefore, the lower grill basket half is accordingly hooked in position on the two end connection plates. Then the article to be grilled is deposited on the lower grill basket half, and thereafter the upper wire basket half is clamped or hooked in position. Because of the eventual reduced volume of the article being grilled, it is possible to adjust the upper grill basket half later by hooking the bent-over ends of the longitudinal rods of the upper wire basket half into a different pair of holes or slits, utilizing a suitable initial tension. In such a case, the bearing axles or spindles remain secured to the connection members.

According to a preferred embodiment of the invention, the clearance between the bent-over longitudinal rod ends and the particular connection clamp is slightly greater than the thickness of the connection plates. As a consequence thereof, the grill basket is rigidly connected when in its closed position.

The holes in the rows of holes are preferably in the form of elongate slots. This arrangement facilitates the hooking-in of the longitudinal rod ends, at least at one end face.

So that it is not necessary to unhook the rod ends every time, it is desirable to mutually adjust the wire basket halves, it may be advantageous to interconnect the holes in the rows of holes by means of respective adjacent slits. By means of lateral displacement, therefore, it is possible to unhook the ends, and in the displaced position the rod ends are guided in the connection members until they have reached the next pair of rows of holes, and the rod ends are hooked in position once more by means of suitable, lateral displacement. In such a case, the elongate holes or slots may be in the form of suitable recesses, so that it is always possible for the rod ends to be securely hooked in position in the mounted position.

The invention will be further illustrated, by way of example, with reference to the accompanying drawings, in which.

Figure 1:
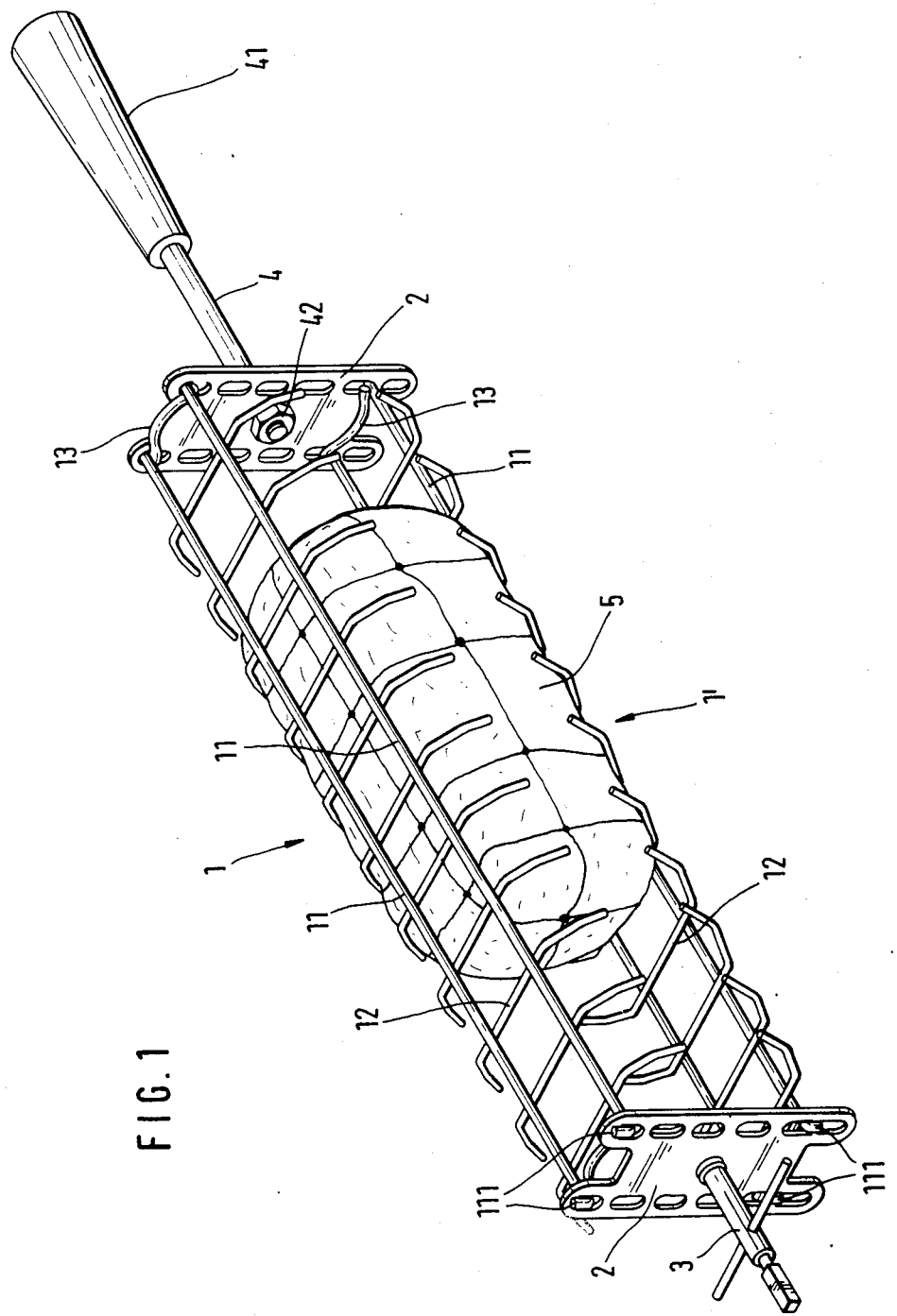
FIG. 1 is a perspective view of a grill basket in its position of use.
Figure 2:
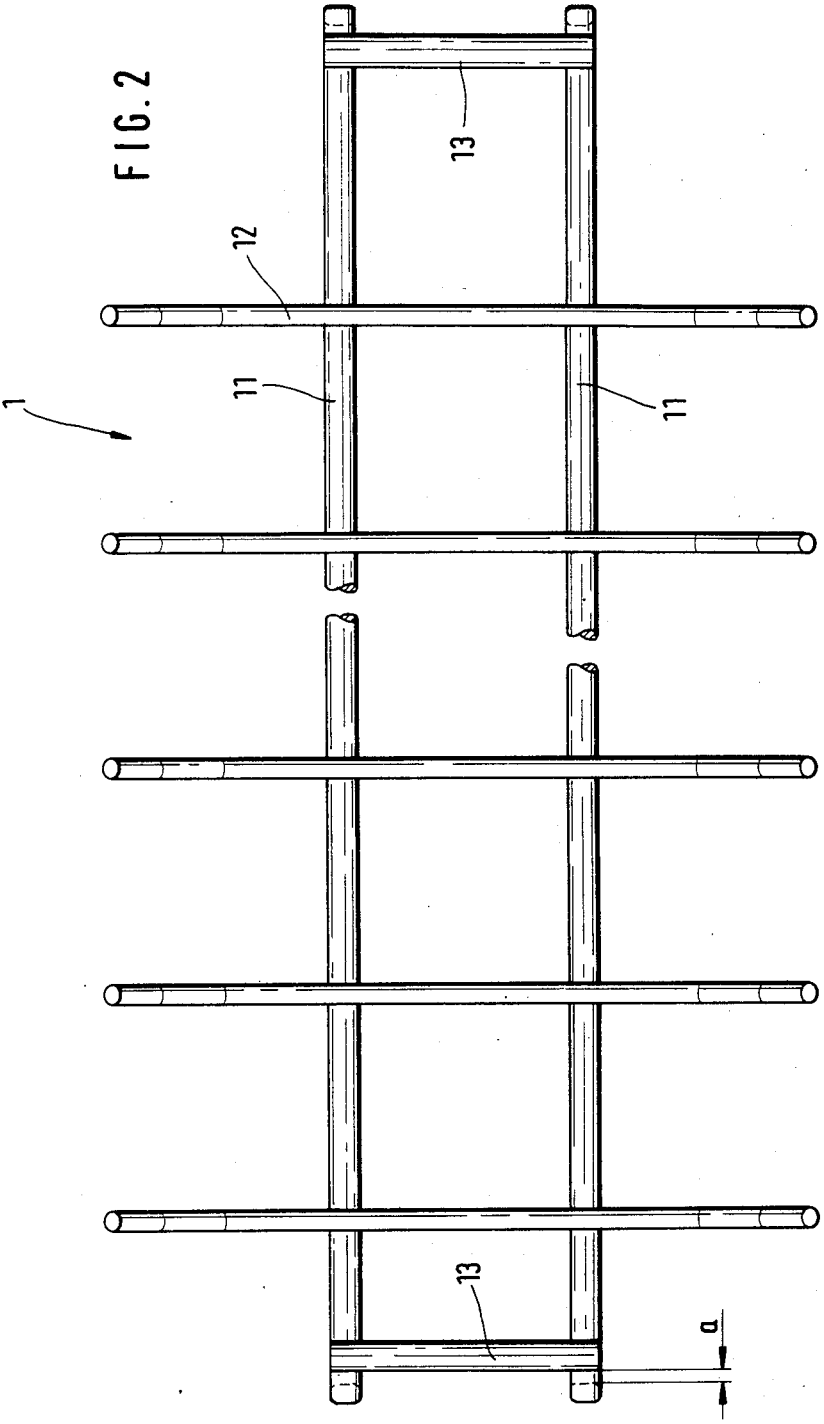
FIG. 2 is bottom plan view of a wire basket half.
Figure 3:
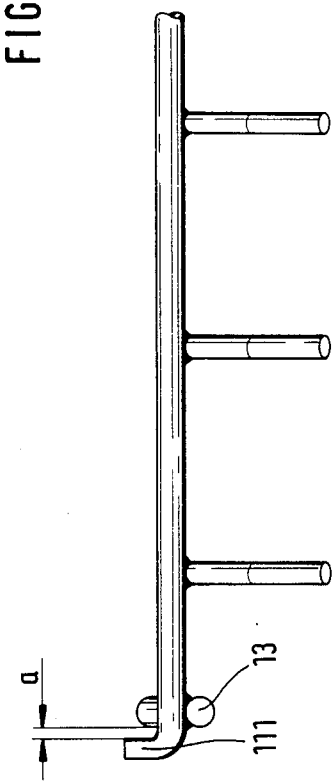
FIG. 3 is a side elevational view corresponding to FIG. 2.
Figure 4:
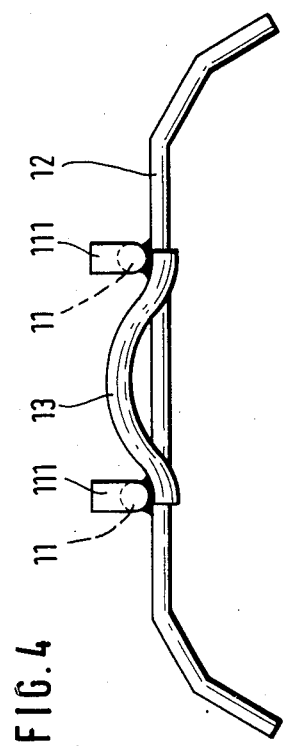
FIG. 4 is an end view corresponding to FIG. 2.

The illustrated rotatable grill basket mainly comprises the two wire basket halves 1 and 1' which have identical structures. Each of these basket halves is formed from two longitudinal rods 11 which are spaced from each other and are bent-over at right angles in a hook-shaped manner at their ends 111. These two longitudinal rods 11 are connected by means of concavely curved or bent-over transverse wires 12 which are provided at uniform distances from one another. An outwardly curved clamping member 13 connects the two longitudinal rods 11 directly in front of the hook ends 111. The clearance a between the hook end 111 and the connection clamp 13 is slightly greater than the thickness of the end connection plates 2.

Figures 5, 6:
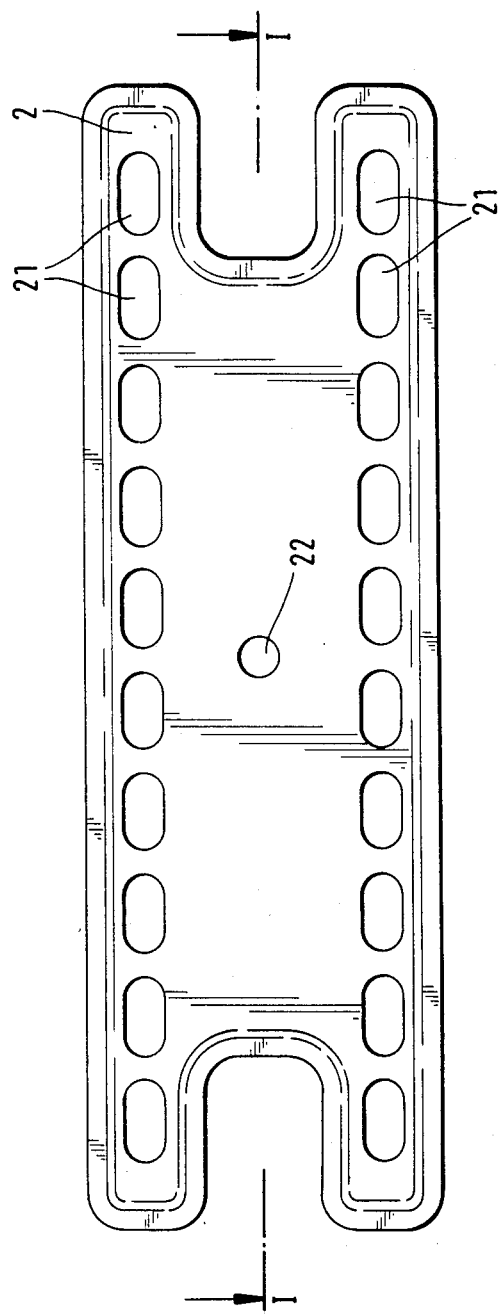
FIG. 5 is a view of a connection plate.
FIG. 6 is a sectional view taken along the line I—I of FIG. 5.

These plates 2, which can be seen particularly in FIGS. 5 and 6, provide the end connection between the wire basket halves 1 and 1', respectively. In their edge regions, said plates 2 have vertical rows of holes 21 in the form of elongate slots. A bore 22 is provided in the center of each plate 2 for the bearing axles or spindles 3 and 4, respectively, to pass therethrough and to be secured thereby.

The spindle 3 is secured to the appropriate plate 2 by means of washers and a nut, or by similar means. An identical securement is provided for the spindle 4, to which a handle 41 is attached. An appropriate securing nut is provided with the reference numeral 42.

For the adjustment of such a grill basket, the lower wire basket half 1' is initially hooked into the two plates 2, which are provided with the appropriate spindles 3 and 4, respectively, in the same way as perforate hooks are secured in perforate walls. The joint of meat, or similar food article, which is indicated by the reference numeral 5, is deposited onto the wire basket half 1' which is open at its upper end. The upper wire basket half 1 can now be hooked into a pair of holes at the appropriate height on the perforate plate 2 so that gentle pressure is exerted when the upper wire basket half 1 is deposited on the joint of meat 5. The hook ends 111 are hooked in position in the corresponding pair of holes in the other connection plate 2 with slight initial tension, so that the basket halves 1 and 1', respectively, are securely held in position in the connection plates 2 by their hooked-in ends.

The holes in the rows of holes may have different shapes. They may be interconnected by means of a lateral displacement slit, so that the two grill basket halves 1 and 1', respectively, can also be re-tightened with respect to each other without the grill basket halves having to be unhooked.

I claim:

1. A grill basket, comprising two wire basket halves, said basket halves being mutually adjustable and each half being formed from a plurality of longitudinal rods having bent-over ends and transverse wires, said basket halves being interconnectable at their ends by connection members and each of said connection members being provided with a spindle to permit rotatable movement, in which said connection members are in the form of plates, each plate having two parallel rows of holes which are spaced from each other, said bent-over ends of said longitudinal rods of the wire basket halves being hookable in said holes, and clamping members being provided which connect said longitudinal rods, said clamping members being in engagement with an inner surface of the plates after the bent-over ends of the longitudinal rods have been hooked therein.

2. A grill basket as recited in claim 1, wherein the said bent-over rod ends are spaced from the particular clamping member, said spacing being slightly greater than the thickness of the plates.

3. A grill basket as recited in claim 1, wherein the rows of holes are in the form of elongate slots.

* * * * *